(12) United States Patent  
Abe et al.

(10) Patent No.: US 8,163,999 B2  
(45) Date of Patent: Apr. 24, 2012

(54) INSULATION-COATED WIRE

(75) Inventors: Tomiya Abe, Hitachi (JP); Yuki Honda, Hitachi (JP); Dai Ishikawa, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 287 days.

(21) Appl. No.: 12/427,323

(22) Filed: Apr. 21, 2009

(65) Prior Publication Data

US 2010/0108356 A1     May 6, 2010

(30) Foreign Application Priority Data

Oct. 31, 2008   (JP) ................................ 2008-281422

(51) Int. Cl.  
*H01B 7/00* (2006.01)

(52) U.S. Cl. ........... 174/110 R; 174/120 R; 174/120 SC

(58) Field of Classification Search .............. 174/110 R, 174/110 A, 110 E, 110 N, 110 PM, 110 SR, 174/120 R, 120 SC; 428/372, 375, 379, 380, 428/383, 384, 386, 387, 389

See application file for complete search history.

(56) References Cited

U.S. PATENT DOCUMENTS

| | | | | |
|---|---|---|---|---|
| 4,503,284 | A | * | 3/1985 | Minnick et al. .................. 174/36 |
| 6,060,162 | A | * | 5/2000 | Yin et al. ....................... 428/372 |
| 6,136,434 | A | * | 10/2000 | Jang et al. ...................... 428/372 |
| 6,225,565 | B1 | * | 5/2001 | Prysner .................... 174/120 SC |
| 6,686,543 | B2 | * | 2/2004 | Massey .................... 174/11 OR |
| 6,811,875 | B2 | | 11/2004 | Kikuchi et al. |
| 7,102,077 | B2 | * | 9/2006 | Aisenbrey ........................ 174/36 |
| 7,244,890 | B2 | * | 7/2007 | Aisenbrey ........................ 174/36 |
| 7,253,357 | B2 | * | 8/2007 | Cipelli et al. .................... 174/36 |
| 2001/0018981 | A1 | * | 9/2001 | Yin et al. .................. 174/120 R |

FOREIGN PATENT DOCUMENTS

| | | |
|---|---|---|
| JP | 3077982 B2 | 6/2000 |
| JP | 2001-307557 A | 11/2001 |
| JP | 2005-112908 A | 4/2005 |
| JP | 2005-251573 A | 9/2005 |
| JP | 2005-285755 A | 10/2005 |
| JP | 2007-5174 A | 1/2007 |

* cited by examiner

*Primary Examiner* — William Mayo, III  
(74) *Attorney, Agent, or Firm* — Foley & Lardner LLP

(57) ABSTRACT

An insulation-coated wire has a conductor, and a semiconductive layer provided at an outer periphery of the conductor. The semiconductive layer has a resin coating including metal fine particles dispersed in a base resin, in which an average particle diameter of the metal fine particles is not greater than 1 μm.

10 Claims, 2 Drawing Sheets

INSULATION-COATED WIRE

The present application is based on Japanese Patent Application No. 2008-281422 filed on Oct. 31, 2008, the entire contents of which are incorporated herein by reference.

BACKGROUND OF THE INVENTION

1. Field of the Invention

The present invention relates to an insulation-coated wire comprising a semiconductive layer, more particularly, to an insulation-coated wire with an excellent partial discharge resistance property.

2. Related Art

In recent years, it has been the mainstream that a motor, a generator and the like employed for vehicles are driven by an inverter drive at a high voltage for improving energy-saving, dynamic performance, or the like.

An enamel-coated wire has been used as the insulation-coated wire used for a coil of such a motor or generator. However, if an overvoltage (inverter surge) occurs in the motor or generator at the time of driving the motor or generator by the inverter drive at the high voltage, a partial discharge may occur in an insulating layer of the enamel wire due to this inverter surge. As a result, there is a high risk that the insulating layer is deteriorated or eroded, thereby causing an insulation breakdown. In addition, when the drive voltage of the motor or generator is increased, the risk of causing the partial discharge in the insulating layer becomes high.

As an approach for suppressing the occurrence of the partial discharge in the insulated wire, a technique of containing carbon particles in a resin coating composing the insulating layer to provide a semiconductive layer as the insulating layer, in order to prevent the partial discharge in the insulating layer has been known. For example, Japanese Patent No. 3077982 (JP-B-3077982), Japanese Patent Laid-Open No. 2007-5174 (JP-A-2007-5174), Japanese Patent Laid-Open No. 2005-285755 (JP-A-2005-285755), and Japanese Patent Laid-Open No. 2005-251573 (JP-A-2005-251573) disclose such a technique.

Further, as an approach for preventing the insulation breakdown, a technique of mixing an inorganic filler such as aluminum oxide, silica, in the resin coating composing the insulating layer, thereby preventing the deterioration or erosion of the insulating layer even though the partial discharge occurs in the insulating layer has been known. For example, Japanese Patent Laid-Open No. 2001-307557 (JP-A-2001-307557) and Japanese Patent Laid-Open No. 2005-112908 (JP-A-2005-112908) disclose such a technique.

However, in the technique of containing the carbon particles in the resin coating composing the insulating layer, there is a disadvantage in that a viscosity of the resin coating may be remarkably increased due to the carbon particles. When the resin coating with the high viscosity is coated and baked on the conductor, unevenness or irregularity in a thickness of the semiconductive layer is caused, so that the semiconductive layer having a uniform thickness and a smooth surface cannot be obtained.

In the technique of mixing the inorganic filler in the resin coating composing the insulating layer, thereby suppressing the deterioration or erosion of the insulating layer in order to prevent the insulation breakdown, an effect of increasing a deterioration resistance property of the insulating layer against the partial discharge can be expected. However, since this technique does not suppress the occurrence of the partial discharge per se, there are various remaining problems, e.g. long-period reliability for maintaining the deterioration resistance property for a long period against the partial discharge, generation of noise due to the partial discharge.

SUMMARY OF THE INVENTION

Accordingly, an object of the present invention is to provide an insulation-coated wire provided with a semiconductive layer having a uniform thickness and a smooth surface, in which the partial discharge due to the inverter surge hardly occurs.

According to a feature of the present invention, an insulation-coated wire comprises:

a conductor; and a semiconductive layer provided at an outer periphery of the conductor, the semiconductive layer comprising a resin coating comprising metal fine particles dispersed in a base resin, wherein an average particle diameter of the metal fine particles is not greater than 1 μm.

In the insulation-coated wire, it is preferable that each of the metal fine particles comprises an organic aggregation-suppressing layer comprising a surface-activating agent on its surface.

In the insulation-coated wire, each of the metal fine particles comprises Ag fine particle or Cu fine particle.

In the insulation-coated wire, the base resin comprises at least one of a polyesterimide resin, a polyamideimide resin, and a polyimide resin.

In the insulation-coated wire, the semiconductive layer may further comprises carbon particles dispersed in the base resin. The semiconductor layer may be formed by coating and baking the resin coating.

The insulation-coated wire may further comprise an insulating layer interposed between the conductor and the semiconductive layer. The insulation-coated wire may further comprise a protective layer for protecting the semiconductive layer, the protective layer being provided at an outer periphery of the semiconductive layer. The average particle diameter is preferably 5 to 50 nm. The content of the metal fine particles contained in the resin coating for forming the semiconductive layer is preferably 2 to 10% by weight with respect to 100% by weight of the base resin. The thickness of the semiconductive layer is preferably 2 to 10 μm.

Advantages of the Invention

According to the present invention, it is possible to provide an insulation-coated wire provided with a semiconductive layer having a uniform thickness and a smooth surface, in which the partial discharge due to the inverter surge hardly occurs.

BRIEF DESCRIPTION OF THE DRAWINGS

Next, the preferred embodiment according to the invention will be explained in conjunction with appended drawings, wherein.

DETAILED DESCRIPTION OF THE PREFERRED EMBODIMENTS

Next, preferred embodiments of the present invention will be explained in more detail in conjunction with appended drawings.

First Preferred Embodiment

Figure 1:
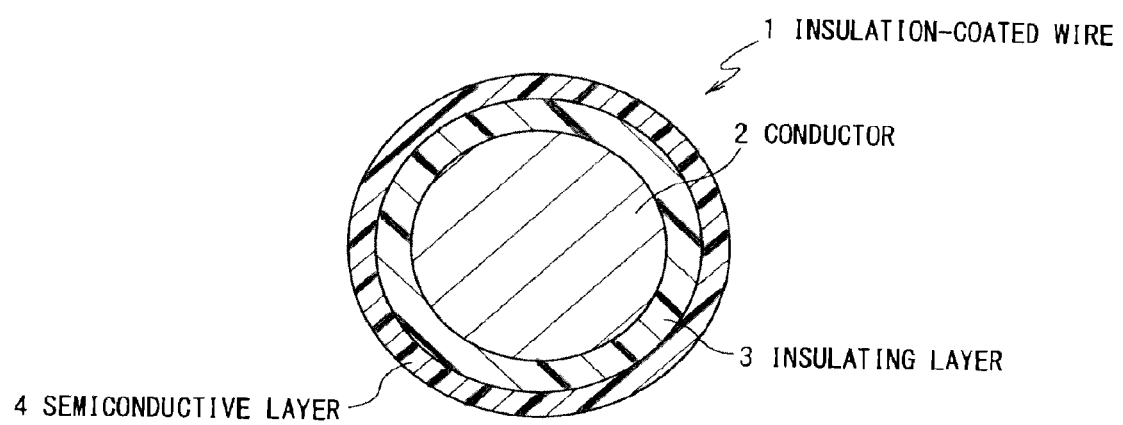
FIG. 1 is a lateral cross sectional view of an insulation-coated wire in a first preferred embodiment according to the invention.

FIG. 1 is a lateral cross sectional view of the insulation-coated wire in a first preferred embodiment according to the present invention.

As shown in FIG. 1, an insulation-coated wire 1 in the first preferred embodiment comprises a conductor 2, an insulating layer 3 provided at an outer periphery of the conductor 2, and a semiconductive layer 4 provided at an outer periphery of the insulating layer 3. The semiconductor layer 4 is formed by coating and baking a resin coating. The semiconductive layer 4 comprises the resin coating comprising metal fine particles dispersed in a base resin, and an average particle diameter of the metal fine particles is not greater than 1 μm, preferably not greater than 100 nm, and more preferably 5 to 50 nm.

As to the conductor 2, a metal wire having a circular cross section of copper or copper alloy or the like may be used. However, the present invention is not limited thereto. The other material may be used for the conductor 2 and the cross section thereof may be other than a perfect circle, e.g. rectangular, oval. An outer diameter of the conductor 2 is preferably 0.5 to 5 mm, since this insulation-coated wire is mainly used as the coil of the motor or generator.

As to the insulating layer 3, the material thereof is not limited as long as the material of the insulating layer 3 is an insulating material which has desirable properties for the insulation-coated wire 1, e.g. abrasion resistance property, heat resistance property. For example, polyesterimide resin, polyamideimide resin or polyimide resin may be used. Further, a mixture of these resins may be also used. A thickness of the insulating layer 3 is preferably 10 to 100 μm.

In the present invention, the "average particle diameter" means an average diameter calculated from a particle distribution obtained from a laser diffraction method. The metal fine particle having the average particle diameter less than or equal to 100 nm is also called as "metal nano particle".

Generally, a fine particle such as carbon particle has an active surface, so that an aggregate is easily formed in the base resin, thereby increasing a viscosity of the base resin. Therefore, when the resin coating containing such an aggregate, particularly, the aggregate having a diameter of several micrometers (μm) is coated on the outer periphery of the conductor directly or via the insulating layer then baked, to form the semiconductive layer, the irregularity or unevenness in the thickness of the semiconductive layer may easily occur due to the aggregate.

Further, in the resin coating containing the fine particle having the average particle diameter greater than 1 μm or the aggregate of such fine particles, a solid greater than 1 μm exists in the semiconductive layer having the thickness of around 5 μm. Therefore, the irregularity or unevenness easily occurs in the coating film at a process of coating the resin coating on the outer periphery of the conductor, so that there is a probability that the semiconductive layer having the uniform thickness and the desirable surface would not be obtained.

Accordingly, in the first preferred embodiment, the metal fine particle having the electric conductivity and the average particle diameter not greater than 1 μm is used as the fine particles to be dispersed in the base resin. According to this structure, the aggregate is hardly formed in the base resin, so that it is possible to suppress the increase in the viscosity of the base resin. As a result, the irregularity or unevenness of the coating film hardly occurs at the process of coating the resin coating containing the metal fine particles on the outer periphery of the conductor 2. Therefore, it is possible to form the semiconductive layer 4 having the uniform thickness and the desirable surface on the outer periphery of the conductor 2 via the insulating layer 3.

Further, when the metal fine particle is used as the fine particle dispersed in the base resin, the metal fine particles in the semiconductive layer 4 are ionized to cause the ion conduction, thereby increasing the electrical conduction in the semiconductive layer 4 in the insulation-coated wire 1 at the high voltage. As a result, it is possible to provide the insulation-coated wire 1 in which the partial discharge due to the inverter surge hardly occurs compared with the conventional insulation-coated wire.

The semiconductive layer 4 may be formed by adding a small amount of the carbon particles to the base resin in which the metal fine particles are dispersed, and the carbon particles are added to the extent that the carbon particles does not aggregate. In this case, it is possible to obtain the function and effect similar to the case that only the metal fine particles are dispersed in the base resin.

The content of the metal fine particles contained in the resin coating for forming the semiconductive layer 4 is preferably 2 to 10% by weight with respect to 100% by weight of the base resin. When the content of the metal fine particles is less than 2% by weight, the occurrence of the partial discharge due to the inverter surge in the insulation-coated wire 1 is increased. When the content of the metal fine particles exceeds 10% by weight, it is difficult to form the semiconductive layer 4 having the uniform thickness and the smooth surface.

The thickness of the semiconductive layer 4 is preferably 2 to 10 μm. When the thickness of the semiconductive layer 4 is less than 2 μm, it is difficult to coat the resin coating in which the metal fine particles are dispersed to have the uniform thickness. On the other hand, when the thickness of the semiconductive layer 4 exceeds 10 μm, the outer diameter of the insulation-coated wire 1 is increased, thereby disturbing downsizing and lightweighting of the motor or generator.

In addition, the metal fine particle preferably comprises an organic aggregation-suppressing layer comprising a surface-activating agent at its surface, so as to suppress the aggregation of the metal fine particles, thereby improving a dispersion property and a coating uniformity. For example, when the metal fine particle comprises the organic aggregation-suppressing layer comprising the surface-activating agent such as aliphatic amine at the surface of the metal fine particle, it is possible to suppress bonding and aggregation of the metal fine particles with each other in the base resin by providing the organic aggregation-suppressing layer. According to this structure, the metal fine particles are easily dispersed with uniformity in the base resin, and variation in the thickness of the semiconductive layer 4 due to the aggregate can be reduced. Therefore, it is possible to form the semiconductive layer 4 having the uniform thickness and the smooth surface at the outer periphery of the conductor 2. The organic aggregation-suppressing layer may be formed by conducting a surface processing on the metal fine particle with the use of the surface-activating agent.

As to the metal fine particle, the material thereof is not limited. It is preferable to use silver (Ag) fine particles or copper (Cu) fine particles, since the electrical conductivity thereof is relatively large, the aforementioned effect can be obtained by adding a small amount thereof, and manufacturing and acquisition thereof are relatively easy.

As to the base resin for the, the material thereof is not limited as long as the material of the base resin is a resin which has desirable properties for the insulation-coated wire such as abrasion resistance property, heat resistance property. For example, polyesterimide resin, polyamideimide resin or polyimide resin may be used. Further, a mixture of these resins may be also used.

As described above, according to the first preferred embodiment, it is possible to provide the insulation-coated wire 1 having the uniform thickness and the smooth surface, in which the semiconductive layer 4 is formed by coating and baking the resin coating comprising the base resin and the metal fine particles dispersed in the base resin, and the metal fine particles have the average particle diameter not greater than 1 μm. Accordingly, the insulation-coated wire 1 in the first preferred embodiment has a high partial discharge inception voltage characteristic, so that the partial discharge due to the inverter surge hardly occurs. Therefore, the insulation-coated wire 1 can be used for the coil of the motor or generator driven by the inverter drive at the high voltage, so that the insulation-coated wire 1 is industrially utile.

Second Preferred Embodiment

Figure 2:
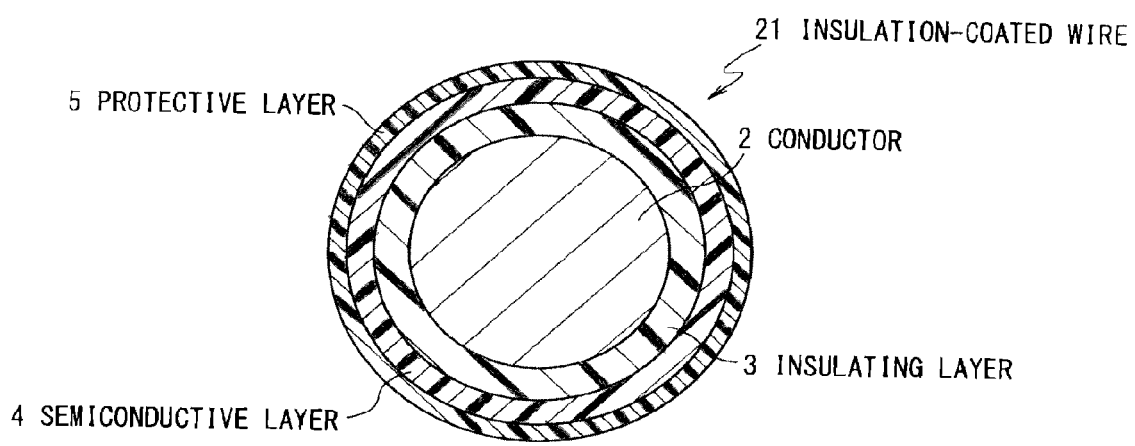
FIG. 2 is a lateral cross sectional view of an insulation-coated wire in a second preferred embodiment according to the invention.

FIG. 2 is a lateral cross sectional view of the insulation-coated wire in a second preferred embodiment according to the present invention.

As shown in FIG. 2, an insulation-coated wire 21 in the second preferred embodiment is similar to the insulation-coated wire 1 in the first preferred embodiment as shown explained in FIG. 1, except that the insulated-coated wire 21 further comprises a protective layer 5 at the outer periphery of the semiconductive layer 4. The protective layer 5 is formed for protecting the semiconductive layer 4 for the purpose of suppressing the damage.

Similarly to the insulating layer 3, the material of the protective layer 5 is not limited as long as the material of the protective layer 5 is a resin which has desirable properties for the insulation-coated wire 1, e.g. abrasion resistance property, heat resistance property. For example, polyesterimide resin, polyamideimide resin or polyimide resin may be used. Further, a mixture of these resins may be also used.

The function and effect similar to the first preferred embodiment can be obtained in the second preferred embodiment.

Other Preferred Embodiments

In the first and second preferred embodiments, an example of the semiconductive layer 4 formed by coating and baking the resin coating in which the metal fine particles are dispersed is explained. However, the present invention is not limited thereto. The semiconductive layer 4 may be formed by coating, drying, and curing the resin coating in which the metal fine particles are dispersed.

In the first and second preferred embodiments, an example of the semiconductive layer 4 formed at the outer periphery of the conductor 2 via the insulating layer 3 is explained. However, the present invention is not limited thereto. The present invention may be applied to the insulation-coated wire in which the semiconductive layer 4 is directly formed at the outer periphery of the conductor 2. In the present invention, the "insulation-coated wire" means an electric wire comprising a semiconductive layer at least at the outer periphery of the conductor.

In the first and second preferred embodiments, the insulating layer 3 comprises a single layer. However, the present invention is not limited thereto. The insulating layer 3 may comprises two or more layers provided at the outer periphery of the conductor 2.

Further, another insulating layer comprising a single layer or multiple layers may be provided on the outer periphery of the semiconductive layer 4.

EXAMPLES

Evaluation of the partial discharge inception voltage in Examples 1 to 4 and Comparative examples 1 to 3 was conducted as follows. The partial discharge inception voltage was measured as a voltage, in which a leakage current of detectivity 10 pC is generated by applying and increasing a sinusoidal voltage of 1 kHz between two insulation-coated wires each of which is twisted for nine times with a weight of 1.5 kg at a distance of 12 cm. In addition, a cross section of the insulation-coated wire 1 or 21 obtained in each of the Examples 1 to 4 and the Comparative examples 1 to 3 was observed with the use of SEM (Scanning Electron Microscope). Conditions of the thickness and the surface of the semiconductive layer 4 were observed.

Example 1

A resin coating comprising a polyamideimide resin was coated on an outer periphery of a Cu conductor 2 having an outer diameter of 1.0 mm and baked to form an insulating layer 3 having a thickness of 33 μm. A resin coating comprising 3% by weight of Ag fine particles having an average particle diameter of 5 nm to 100% by weight of a resin content of the polyamideimide resin was coated on an outer periphery of the insulating layer 3 to form a Ag-containing semiconductive layer 4 having a thickness of 3 μm at the outer periphery of the insulating layer 3, thereby providing the insulation-coated wire 1. In the Example 1, the partial discharge inception voltage of this insulation-coated wire 1 was equal to or greater than 5 kV. The thickness of the semiconductive layer 4 was uniform and the semiconductive layer 4 had the smooth surface.

Example 2

A resin coating comprising a polyamideimide resin was coated on an outer periphery of a Cu conductor 2 having an outer diameter of 1.0 mm and baked to form an insulating layer 3 having a thickness of 33 μm. A resin coating comprising 3% by weight of Cu fine particles having an average particle diameter of 20 nm to 100% by weight of a resin content of the polyamideimide resin was coated on an outer periphery of the insulating layer 3 to form a Cu-containing semiconductive layer 4 having a thickness of 3 μm at the outer periphery of the insulating layer 3, thereby providing the insulation-coated wire 1. In the Example 2, the partial discharge inception voltage of this insulation-coated wire 1 was equal to or greater than 5 kV. The thickness of the semiconductive layer 4 was uniform and the semiconductive layer 4 had the smooth surface.

Example 3

A resin coating comprising a polyamideimide resin was coated on an outer periphery of a Cu conductor 2 having an outer diameter of 1.0 mm and baked to form an insulating layer 3 having a thickness of 33 μm. A resin coating comprising 2% by weight of Cu fine particles having an average particle diameter of 20 nm and 1% by weight of "KETJEN-BLACK™ EC600JD" as carbon particles to 100% by weight of a resin content of the polyamideimide resin was coated on an outer periphery of the insulating layer 3 to form a semi-conductive layer 4 containing Cu and carbon particles having a thickness of 3 μm at the outer periphery of the insulating layer 3, thereby providing the insulation-coated wire 1. In the Example 3, the partial discharge inception voltage of this insulation-coated wire 1 was equal to or greater than 5 kV. The thickness of the semiconductive layer 4 was uniform and the semiconductive layer 4 had the smooth surface. The "KETJENBLACK EC600JD" is electro-conductive carbon fabricated by Akzo Nobel Chemicals B.V.

Example 4

A resin coating comprising a polyamideimide resin was coated on an outer periphery of a Cu conductor 2 having an outer diameter of 1.0 mm and baked to form an insulating layer 3 having a thickness of 33 μm. A resin coating comprising 3% by weight of Cu fine particles having an average particle diameter of 20 nm to 100% by weight of a resin content of the polyamideimide resin was coated on an outer periphery of the insulating layer 3 to form a Cu-containing semiconductive layer 4 having a thickness of 3 μm at the outer periphery of the insulating layer 3. Further, a resin coating comprising a polyamideimide resin was coated on the Cu-containing semiconductive layer 4 to form a protective layer 5, thereby providing the insulation-coated wire 21. In the Example 4, the partial discharge inception voltage of this insulation-coated wire 21 was equal to or greater than 5 kV. The thickness of the semiconductive layer 4 was uniform and the semiconductive layer 4 had the smooth surface.

Comparative Example 1

A resin coating comprising a polyamideimide resin was coated on an outer periphery of a Cu conductor having an outer diameter of 1.0 mm and baked to form an insulating layer having a thickness of 33 μm, thereby providing an insulation-coated wire. The partial discharge inception voltage of this insulation-coated wire was 700V.

Comparative Example 2

A resin coating comprising a polyamideimide resin was coated on an outer periphery of a Cu conductor having an outer diameter of 1.0 mm and baked to form an insulating layer having a thickness of 33 μm. A resin coating comprising 3% by weight of Ag fine particles having an average particle diameter of 2 μm to 100% by weight of a resin content of the polyamideimide resin was coated on an outer periphery of the insulating layer to form a Ag-containing semiconductive layer having a thickness of 3 μm at the outer periphery of the insulating layer, thereby providing the insulation-coated wire. In the insulation-coated wire in the Comparative example 2, there were defects that a surface roughness of the semiconductive layer was remarkable and that several areas of the surface of the insulating layer are not coated with the semiconductive layer. Therefore, it was impossible to provide the insulation-coated wire in which the partial discharge inception voltage can be measured.

Comparative Example 3

A resin coating comprising a polyamideimide resin was coated on an outer periphery of a Cu conductor having an outer diameter of 1.0 mm and baked to form an insulating layer having a thickness of 33 μm. A resin coating comprising 6% by weight of KETJENBLACK EC600JD to 100% by weight of a resin content of the polyamideimide resin was coated on an outer periphery of the insulating layer to form a carbon-containing semiconductive layer having a thickness of 3 μm at the outer periphery of the insulating layer, thereby providing the insulation-coated wire. In the insulation-coated wire in the Comparative example 3, there were defects that a surface roughness of the semiconductive layer was remarkable and that several areas of the surface of the insulating layer are not coated with the semiconductive layer. Therefore, it was impossible to provide the insulation-coated wire in which the partial discharge inception voltage can be measured.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. An insulation-coated wire used for a motor or a generator driven by an inverter drive comprising:
    a conductor; and
    a semiconductive layer for preventing an occurrence of partial discharge provided at an outer periphery of the conductor, the semiconductive layer comprising a resin coating comprising metal fine particles dispersed in a base resin,
    wherein an average particle diameter of the metal fine particles is not greater than 1 μm,
    wherein each of the metal fine particles comprises an organic aggregation-suppressing layer comprising a surface-activating agent on a surface, and
    wherein the surface-activating agent comprises aliphatic amine.

2. The insulation-coated wire according to claim 1, wherein each of the metal fine particles comprises Ag fine particles.

3. The insulation-coated wire according to claim 1, wherein each of the metal fine particles comprises Cu fine particles.

4. The insulation-coated wire according to claim 1, wherein the base resin comprises at least one of a polyesterimide resin, a polyamideimide resin, and a polyimide resin.

5. The insulation-coated wire according to claim 1, wherein the semiconductive layer further comprises carbon particles dispersed in the base resin.

6. The insulation-coated wire according to claim 1, wherein the semiconductor layer is formed by coating and baking the resin coating.

7. The insulation-coated wire according to claim 1, further comprising:
    an insulating layer interposed between the conductor and the semiconductive layer.

8. The insulation-coated wire according to claim 1, further comprising:
    a protective layer for protecting the semiconductive layer, the protective layer being provided at an outer periphery of the semiconductive layer.

9. The insulation-coated wire according to claim 1, wherein a content of the metal fine particles contained in the resin coating for forming the semiconductive layer is 2 to 10% by weight with respect to 100% by weight of the base resin.

10. The insulation-coated wire according to claim 1, wherein a thickness of the semiconductive layer is 2 to 10 μm.

* * * * *